United States Patent [19]

Zumbach

[11] 4,137,639
[45] Feb. 6, 1979

[54] DEVICE FOR THE MEASUREMENT OF THE WALL THICKNESS OF TUBES

[75] Inventor: Heinz Zumbach, Biel, Switzerland

[73] Assignee: Zumbach Electronic AG, Orpund, Switzerland

[21] Appl. No.: 858,853

[22] Filed: Dec. 8, 1977

[30] Foreign Application Priority Data

Dec. 22, 1976 [CH] Switzerland ............. 16169/76

[51] Int. Cl.² .................................... G01B 7/06
[52] U.S. Cl. ..................... 33/147 L; 33/147 N; 33/148 H; 33/178 E; 324/231
[58] Field of Search ............ 33/143 L, 147 L, 147 N, 33/147 K, 148 H, 149 J, 174 L, 178 E, 178 F; 324/229, 231

[56] References Cited

U.S. PATENT DOCUMENTS

| 2,423,671 | 1/1969 | Vezin | 33/178 F |
| 2,519,221 | 8/1950 | Bogen et al. | 33/178 E |
| 2,563,254 | 8/1951 | Lewis | 33/147 N |
| 2,855,685 | 10/1958 | Barreteau | 33/178 F |
| 3,882,606 | 5/1975 | Kaenel et al. | 33/174 L |

FOREIGN PATENT DOCUMENTS

| 1059672 | 6/1959 | Fed. Rep. of Germany | 33/147 N |
| 200536 | 10/1967 | U.S.S.R. | 33/178 F |

Primary Examiner—Richard R. Stearns

[57] ABSTRACT

A device for the measurement of the wall thickness of tubes, in particular for the measurement of extruded synthetic tubes during the extrusion process, comprises a common support for location within the tube and a plurality of measuring bodies mounted on the support and urged resiliently outwards for engagement with the tube wall. In order to provide a sufficiently robust support for the measuring bodies they are connected to the support by means of a parallelogram linkage, and in order to allow the measuring bodies a degree of free movement so that they can conform to the contour of the tube wall at least one parallelogram arm of the parallelogram linkage is pivoted with free play.

11 Claims, 3 Drawing Figures

U.S. Patent
Feb. 6, 1979
4,137,639
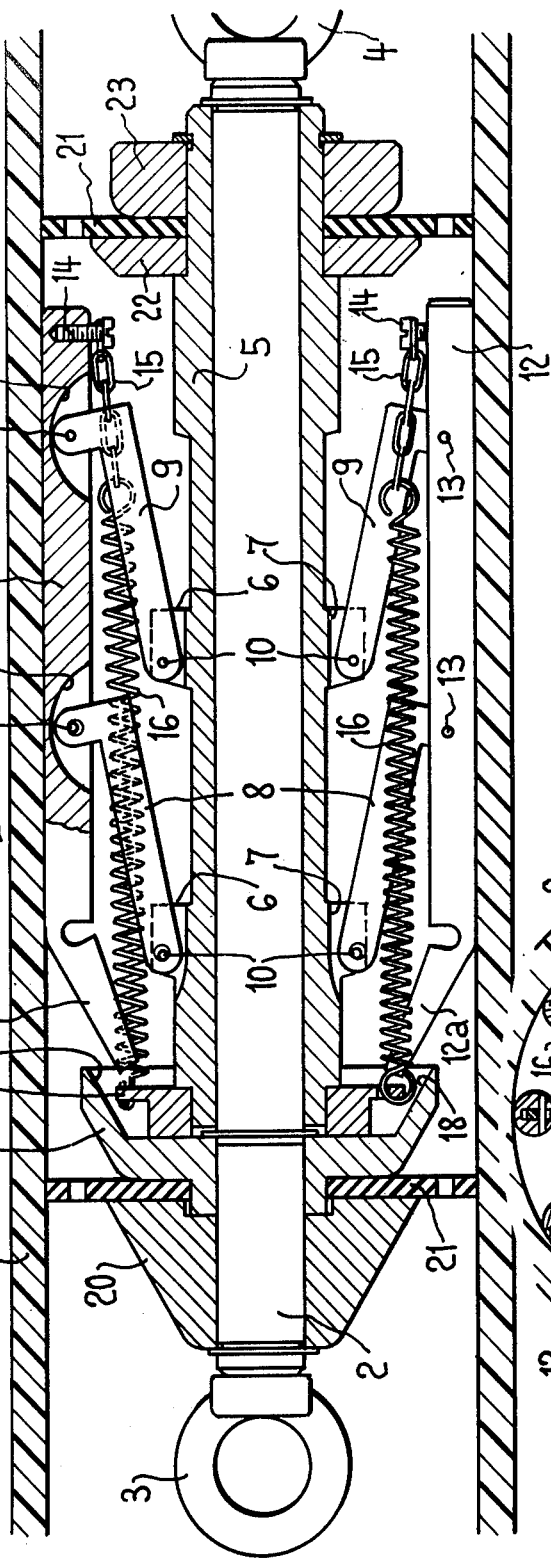
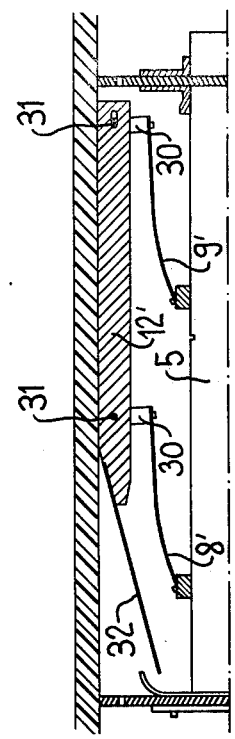
FIG. 1
FIG. 2
FIG. 3

DEVICE FOR THE MEASUREMENT OF THE WALL THICKNESS OF TUBES

BACKGROUND OF THE INVENTION

The present invention relates to apparatus for the measurement of the wall thickness of tubes, having measuring bodies which bear resiliently against the inner wall surface of the tube and which react upon a measuring device arranged externally of the tube wall. Such measuring devices are used in particular for the testing of the wall thickness of synthetic tubes immediately after the issue of these tubes from the nozzle of an extruder. It has been shown that during this use of the measuring device a stable support of the measuring body and an efficient protection of the same from damage is indispensable, since especially at the beginning of production substantial irregularities often occur on the inner wall surface of the tube, which can damage the measuring body bearing against the wall of the tube, or its support.

SUMMARY OF THE INVENTION

It is the object of the present invention to provide a device for the measurement of the wall thickness of tubes which comprises measuring bodies which bear resiliently and softly against the inner wall surface of the tube, and in which nevertheless the support of the measuring bodies is especially stable and which additionally permits measurements within a greater range of diameters.

The device according to the invention is characterised in that each measuring body is supported upon a common support by means of parallelogram arms, at least one of the parallelogram arms being supported with free play, and that spreading spring forces act upon the measuring body. The support of the measuring body by means of parallelogram arms proves to be sufficiently robust, and yet is, owing to the arrangement of at least one of the parallelogram arms, sufficiently flexible to guarantee a constant full contact of the measuring body against the inner wall of the tube.

BRIEF DESCRIPTION OF THE DRAWINGS

FIG. 1. is a longitudinal section through a device according to the invention,

FIG. 2 is a cross-section through the device shown in FIG. 1 and

FIG. 3 illustrates a modified embodiment.

DESCRIPTION OF THE PREFERRED EMBODIMENT

In the tube 1 to be tested, for example a synthetic tube issuing from an extruder, is arranged the part of the measuring device embodying the invention. It comprises a cylindrical mandrel 2, with which end rings 3 and 4 are connected. The ring 3 serves for the attachment of a tension element which can be attached on the mandrel of the extruder nozzle and thereby serve for the anchoring of the illustrated part in the moving tube. On the ring 4 can be connected further means to be located in the inside of the tube, for example a closure member for the production of an excess pressure.

On the mandrel 2 is located a tubular support 5, which is provided with two rings of eyes 6, each of which has a slot 7 in which engages a forward parallelogram arm 8 or a rearward parallelogram arm 9, the parallelogram arms each being pivotably connected by means of a pin 10. The outer ends of the parallelogram arms 8 and 9, which are bent outwardly at right angles, engage in slots 11 of rod-shaped cylindrical measuring bodies 12, which consist of an electrically conductive material or are coated with such a material. The parallelogram arms 8 and 9 are pivotably supported in these slots 11 by means of pins 13. While the rear parallelogram arms are supported inwardly and outwardly on the pins 10 and 13 substantially without play, the forward parallelogram arms 8 are connected with play, as shown in FIG. 1. The measuring bodies 12 are consequently not held rigidly parallel to the support 5, but can take up a slightly inclined position and thus constantly apply themselves fully against the inner wall of the tube 1.

At the inner side of the rear end of the measuring body 12 are located screws 14 on which engage chains 15. Tension springs 16 act upon the chains 15, each tension spring being arranged between adjacent measuring bodies 12, and the springs being anchored to a disc 17 which is located upon a shoulder of the support 5.

The forward ends 12a of the measuring bodies 12 are bent inwardly, and are located in the region of a frustoconical stop surface 18 of a respective annular stop member 19. Between the stop member 19 and a clamping cone 20 is a disc 21 formed out of soft synthetic material or rubber, of which the diameter corresponds to the internal diameter of the tube. At the rear end of the support 5 a corresponding disc of soft synthetic material or rubber is located by means of clamping discs 21 and 23.

Outside of the tube 1 in the region of the measuring bodies 12 there is arranged a measuring head, not shown, of which a measuring sensor is applied to the outer side of the tube 1 or is located at a defined distance from the outer surface of the tube 1. The measuring bodies 12 cooperate with the measuring sensor in known manner, and the correspondingly determinable distance between the measuring bodies 12 and the measuring sensor enables the local thickness of the tube wall to be determined.

In operation the tube 1 travels in the direction of the arrow from left to right in FIG. 1, and the measuring bodies 12 spread outwardly under the tension of the springs 16 and conform satisfactorily to the inner surface of the tube 1. Since the line of action of the spring forces passes inside the pivotal axes 13 of the measuring bodies, the spring forces tend to pivot the measuring bodies 12 outwardly about the rear pivotal axes 13, so that the measuring bodies always conform satisfactorily overall. In particular the forward ends of the measuring bodies are pressed outwards, and the arrangement of the forward parallelogram arms 8 with play also permits a slight inclination of the individual measuring bodies 12 relatively to the support 5. The inwardly inclined end 12a of the measuring bodies ensure an inward shifting of the measuring bodies, when, in particular at the beginning of production, pronounced irregularities of the tube wall travel past. Such irregularities can also travel past the stop means 19 without difficulty, since the latter is, because of the inwardly bent forward ends 12a of the measuring bodies, enabled to have an external diameter substantially smaller than the inner diameter of the tube or the diameter taken up by the measuring bodies 12 in their working positions.

When the illustrated part of the measuring devices leaves the tube 1, the measuring bodies 12 are spread outwardly until their forward ends 12a bear against the stop surface 18. The forward ends of the measuring bodies therefore rest protected within the stop member 19, and when the illustrated part is again fed into a tube, the edges or irregularities of the tube cannot catch the forward extremities of the measuring bodies 12, but can only engage upon the inclined outer surface of the inwardly bent ends 12a of the measuring bodies, and these measuring bodies push inwardly without substantial effort.

The illustrated construction has the further advantage that for the definition of the range of measurement only the stop member 19 and the discs 21 need to be exchanged. This exchange can be effected relatively easily after removal of the rings 3, 4 and the spring rings securing the parts 20 and 23. In an alternative embodiment, it would also be possible to construct the exchangeable parts, in particular the stop member 19, in several separable parts, so that they can be removed laterally from the support 5 and the mandrel 2 respectively without the need for disassembly of the parts located axially in front of them.

In a further variant of the present invention, illustrated by FIG. 3, the parallelogram arms 8 and 9 are replaced by leaf springs 8' and 9', of which the inner end is firmly connected to the support 5, whereas the outer ends are connected to the measuring body 12' by means of blocks 30 which are pivotly coupled with the measuring body by means of pins 31. The back block 30 is coupled to the measuring body 12' with free play, which causes its said mobility. In the place of the inwardly bent ends 12a of the measuring bodies, inwardly inclined leaf springs 32 are connected with the measuring bodies. Any characteristics of both variants of the present invention can be exchanged, i.e. for example the measuring bodies 12 of FIGS. 1 and 2 could be suspended by means of leaf springs whereby the tension springs 16 fall away.

I claim:

1. A device for measuring the wall thickness of tubes, including a common support member defining an axis for insertion within the tube, a plurality of parallelogram linkage means connected between said support member and a corresponding plurality of elongated measuring bodies, said linkage means being arranged around said support for supporting said measuring bodies generally parallel to said axis and permitting movement thereof generally radially with respect to said support member axis, at least one parallelogram arm connected in each said linkage means with free play such that the respective measuring body is allowed a degree of angular movement relatively to said support member axis, and means for resiliently urging said measuring bodies radially outwardly into contact with the inner surface of a tube wall.

2. A device according to claim 1, wherein an array of generally rod-shaped measuring bodies are arranged in a ring around said support member, and said device further includes means located on said support member to provide a common ring-shaped stop surface surrounding all of said measuring bodies at one end, whereby the outward movement of said bodies relatively to said support member is limited.

3. A device according to claim 2, wherein each of the said measuring bodies is bent inwardly towards said common support member at the end surrounded by said stop surface, whereby said means provided with said stop surface has a diameter which is smaller than the diameter of the array of measuring bodies in any given working position.

4. A device according to claim 2, wherein each parallelogram arm is linked to a measuring body by means of a pivot axis, and a resilient pull is acting upon each measuring body, the axis of said resilient pull acting onto each measuring body passing radially outside one of said parallelogram arms but radially inside the pivotal axis of said one parallelogram arm, whereby the said resilient pull tends to swing said one parallelogram arm radially outwardly and to pivot the measuring body radially outwardly about said pivotal axis thereby applying said measuring body on its full length against the wall of said tube.

5. A device according to claim 4, wherein each of the said measuring bodies is bent inwardly towards said common support member at the end surrounded by said stop surface, whereby the means provided with said stop surface has a diameter which is smaller than the diameter of the array of measuring bodies in any given working position, wherein the said resilient urging means is arranged to act upon that end of each measuring body which is not inwardly bent.

6. A device according to claim 5, wherein the said resilient urging means comprises a plurality of tension springs each of which is located between two adjacent measuring bodies and is coupled therewith by means of a flexible coupling member connected to said bodies.

7. A device according to claim 5, wherein the said parallelogram linkage means by which each measuring body is connected to the said common support member includes two parallelogram arms of which one is the said arm connected with play and the other is connected without play, and the point upon which said resilient urging means acts upon the measuring body is located adjacent that arm which is connected without play.

8. A device according to claim 2, wherein the said means providing said stop surface is detachably mounted on one end of the support member so that it is easily interchangeable for selection of the range of diameters through which the measuring bodies are movable.

9. A device according to claim 8, comprising parallelogram arms formed as leaf springs applying spring forces to the measuring bodies.

10. A device according to claim 1, wherein centering discs of soft material are detachably mounted on both sides of said support member.

11. A device according to claim 1, wherein said measuring bodies have inwardly inclined ends formed as leaf springs.

* * * * *